Aug. 16, 1932.    J. F. McKEE    1,872,088
EXPANSION JOINT
Filed Oct. 12, 1927    2 Sheets-Sheet 2
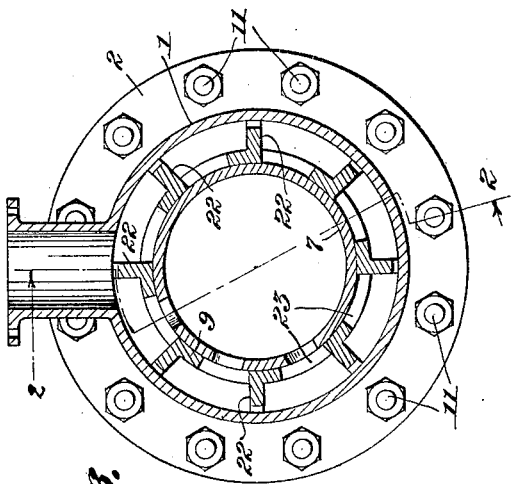
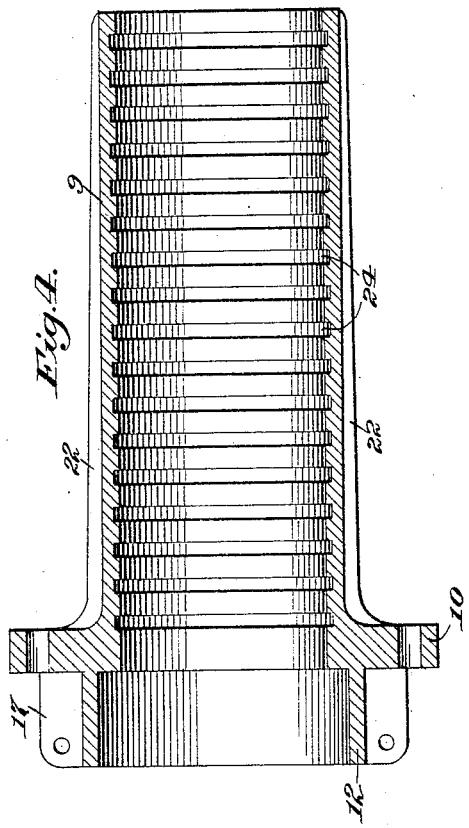
Inventor:
J. F. McKee,
By H. Phil
Att'y.

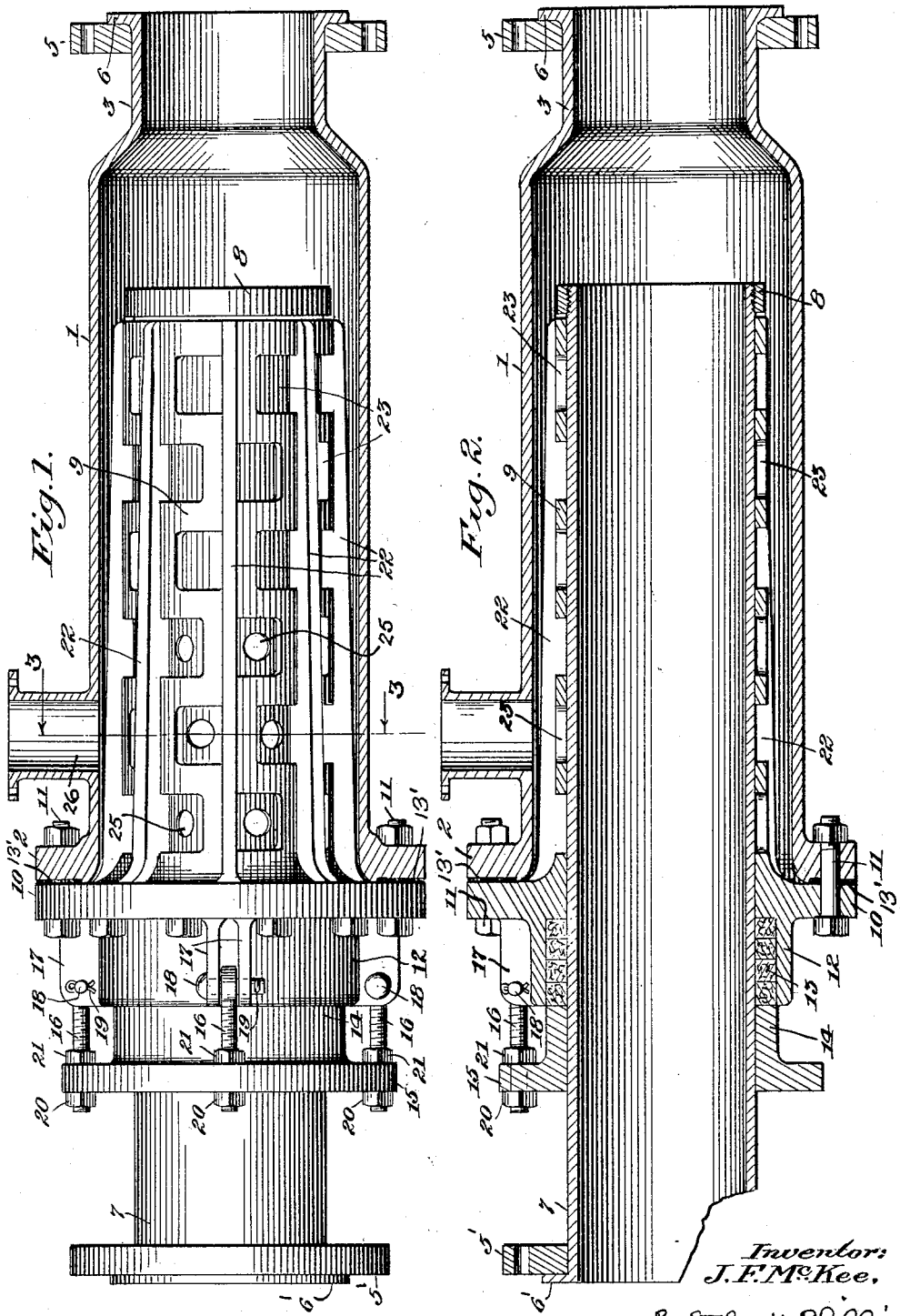

Patented Aug. 16, 1932

1,872,088

UNITED STATES PATENT OFFICE

JOHN F. McKEE, OF PHILADELPHIA, PENNSYLVANIA, ASSIGNOR TO YARNALL-WARING COMPANY, OF PHILADELPHIA, PENNSYLVANIA, A CORPORATION OF PENNSYLVANIA

EXPANSION JOINT

Application filed October 12, 1927. Serial No. 225,756.

This invention relates to expansion joints of the slip type for use in pipe lines and provides such a joint which possesses characteristics of simple, economical construction, ease of application, durability, and ease of packing and repacking, because of the novel construction and mode of operation described.

Referring to the drawings:

Figure 1 illustrates an embodiment of my invention in which the body portion of the joint is shown in section and the guide packing gland, packing ring, and sleeve are in side elevation;

Figure 2 represents the same embodiment in which all of the parts are shown in section on the line 2—2 of Figure 3;

Figure 3 is a cross sectional view of the same embodiment on the lines 3—3 of Figure 1, looking in the direction of the arrows;

Figure 4 is a longitudinal sectional view of a modified form of guide and packing gland.

Referring to the form of the device illustrated in Figures 1, 2 and 3, 1 represents the body portion of the expansion joint which is advantageously made somewhat larger in diameter than the pipe line, the end thereof, which is to be joined to the pipe line, being advantageously reduced in diameter as indicated at 3 to approximate the diameter of the pipe line. It is provided with suitable means for coupling to the pipe line, such as the coupling ring 5 and flange 6 illustrated in the drawings. At its opposite end the body portion 1 is provided with a heavy collar 2 formed, welded, or otherwise suitably affixed thereon, whereby it may be coupled to the gland guide member, as hereinafter described.

The sleeve member of the joint is designated by 7 and is provided at its outer end with suitable means for coupling to the pipe line, such as the flange 6' and coupling ring 5'.

The sleeve 7 is adapted for insertion into the gland and guide member 9, the inner surface of the guide member and the outer surface of the sleeve member being advantageously machined to an accurate fit and provided with smooth, hard, corrosion resisting surfaces. It is sometimes desirable to plate the co-acting surfaces of the sleeve or guide member or both with chromium, copper, or other corrosion and/or wear resisting metal or alloy.

The guide member 9, as will be noted, is somewhat smaller in diameter than the body portion 1 and, being exposed to contact with the fluid contents of the pipe line, it is maintained at substantially the same temperature as the sleeve member 7. Thus, any tendency of the guide and sleeve to bind because of temperature differences is minimized. The guide member 9 may be advantageously made of light construction and provided with a series of strengthening ribs 22 and openings 23 may be advantageously cut through the guide member 9, preferably in a zigzag pattern between the strengthening ribs, as illustrated in Figure 1.

The inner edges of the openings 23 are advantageously made sharp so as to scrape off any foreign matter that may become lodged on the sleeve.

The guide member is provided with a heavy collar 10 formed, welded or otherwise suitably affixed thereon, which is adapted to co-operate with the collar 2 of the body member 1 for tightly coupling the same together as by means of a plurality of bolts 11. On the outer side of the collar 10 a gland or packing cup 12 is provided which is advantageously made integral with said guide member. A packing ring 14 on the sleeve 7 cooperates with the sleeve 7 and gland 12 to secure and compress the packing 13. For this purpose the packing ring 14 is provided with a collar 15 which is secured by bolts 16 to flanges 17 formed on the gland 12. The bolts 16 are advantageously hinged between pairs of flanges 17 by means of pins 18 passing through perforations in said pairs of flanges and held therein by cotter pins 19. Adjustment of the packing ring 14 is secured by nuts 20 and 21 on the bolts 16 which nuts hold respectively the inner and outer faces of the collar 15. Between the collar 10 and the flange 2 I place suitable packing 13' as shown.

Stop means, such as the ring 8 threaded or otherwise secured on the extreme inner end of the sleeve 7, may be advantageously provided to prevent the inadvertent withdrawal of the sleeve 7 from the guide 9.

Orifices 25 may be provided in sleeve 7 for the purpose of conveying steam or other fluid therein to an escape outlet, such as a service outlet 26.

It will be noted that by means of the foregoing construction, the parts are always properly centered with respect to each other and positive alignment and easy sliding of the sleeve through the packing gland is assured. Moreover, the packing ring may be loosened and the packing removed and renewed without disturbance of the alignment since the length of the guide is such that there is no substantial tendency for the parts to get out of alignment even when the packing ring is loosened.

The relative immovability of guide 9 and gland 12, which are preferably integral, is of primary importance with respect to securing and maintaining alignment of sleeve 7 with gland 12 and guide 9.

Another advantage of the construction is that the guide does not have to withstand the pressure of whatever fluid the pipe may carry and, therefore, may be built of relatively light material. This has the further advantage that the guide member may have a certain amount of give and accommodate itself to slight circumferential or axial changes in the sleeve without causing sticking or binding, such as would occur if the body portion 1 of the joint were used as the guide.

It will be evident that, by securing the guide 9 at one end only, and spacing it well inwardly from the outer joint casing, I insure that the fluid of the pipe line can freely come in contact with the outside of the guide throughout practically the entire length of the guide, so that the guide is at all times at the same temperature as the inner slide 7. By removing material from the body of the guide, I not only materially lighten the guide and add to its resilience, but I also admit the fluid of the pipe line into contact with the sleeve at intervals and also permit ready removal of foreign matter which may stick to the outer surface of the inner slide 7.

The supporting of the guide 9 from one end only is not only advantageous in admitting the fluid of the pipe line annularly around the guide, but also aids in preventing binding between the inner slide and the guide, because radial stress components between the inner slide and the guide may be taken up by resilient yielding of the unsupported end of the guide about the supporting collar of the guide.

The materials from which the device is constructed may, of course, be varied to suit the needs of the particular use to which the device is to be applied. For many purposes I have found it desirable to construct the sleeve 7 of steel pipe covered with chromium, the guide 9 of cast iron, the body 1 of steel pipe, but for special uses it is obvious that other materials may be preferable.

Figure 4 illustrates a modified type of guide 9 in which the surface of the guide is made without openings 23 but instead is provided with a plurality of annular grooves 24 having sharp edges which serve to scrape off and receive from the sleeve 7 any dirt that may have become lodged thereon. In other respects the construction and mode of operation of the modification illustrated in Figure 4 is like that of the device described in connection with the first three figures.

Various changes may be made in the embodiments herein described. For example, guide 9 may be so constructed that it is not a continuous cylinder but instead is perforated or grooved. Other variations and modifications may be made within the scope of the invention herein described and claimed.

I claim:

1. A pipe line expansion joint sleeve guide adapted to extend into the joint body annularly around the joint sleeve in spaced relation to the joint body, providing an annular space around the guide where it engages the sleeve, the space being accessible to the pipe line content, to prevent lateral movement of the pipe line and to slidably receive the joint sleeve with a very close fit and provided with a collar at one end for securing it to the joint body and being supported only at its collar end.

2. A pipe line expansion joint sleeve guide adapted to slidably receive the joint sleeve with a close fit to prevent lateral movement of the pipe line, to be rigidly positioned with respect to the joint body and to extend into said body, annularly around the joint sleeve in spaced relation to the joint body providing an annular space around the guide where it engages the sleeve, the space being accessible to the pipe line content, said guide being of lighter construction than said body and provided with axially extending reinforcing and bracing means.

3. A pipe line expansion joint sleeve guide adapted to slidably receive the joint sleeve with a close fit to prevent lateral movement of the pipe line and to be rigidly positioned with respect to the joint body against relative axial movement, and to extend into said body annularly around the joint sleeve in spaced relation to the joint body for a substantial portion of its length and unsupported except at its outer end providing a longitudinally extending annular space around the guide where it engages the sleeve, the space being accessible to the pipe line content, said guide being of such light construction as to be capable of yielding as a whole within itself, whereby it may be deformed slightly to accommodate itself to slight deformations in the shape of the sleeve under strain.

4. A pipe line expansion joint sleeve guide adapted to slidably receive the joint sleeve with a very close fit and to be associated with the joint body against relative lateral movement and to extend annularly around the joint sleeve for the greater part of its length otherwise unsupported in, and in spaced relation to, said body providing an annular space around the guide where it engages the sleeve the space being accessible to the pipe line content, said guide having its inner end otherwise unsupported, and being formed with radially extending openings at frequent intervals.

5. A pipe line expansion joint sleeve guide adapted to slidably receive the joint sleeve with a close fit to prevent lateral movement of the pipe line and to be rigidly positioned with respect to the joint body at its outer end and to extend annularly around the joint sleeve otherwise unsupported into said body in spaced relation thereto providing an annular space around the guide where it engages the sleeve, the space being accessible to the pipe line content, in combination with a packing gland arranged at such point as to be located, in assembled relation, outside of said body, and so associated with said guide as to be immovable with relation thereto and concentric with the inner face thereof.

6. A pipe line expansion joint sleeve guide provided with a collar at its outer end for securing it to the joint body and adapted to slidably receive the joint sleeve with a close fit to prevent lateral movement of the pipe line and to extend annularly around the joint sleeve into said body in spaced relation thereto, providing an annular space around the guide where it engages the sleeve, the space being accessible to the pipe line content in combination with a packing gland formed integrally upon the outer end of said guide.

7. In a pipe line expansion joint, a sleeve, and a body secured against lateral movement with respect to it and into which the sleeve extends, in combination with a guide slidably receiving said sleeve with a close fit, said guide being secured at its outer end to said body and extending annularly around the joint sleeve otherwise unsupported into said body in spaced relation thereto for sufficient distance to provide such an area of the inner face of the guide in opposition to the opposed face of the sleeve as to prevent misalignment of the sleeve with relation to the guide, providing an annular space around the guide where it engages the sleeve, the space being accessible to the pipe line content, said guide having sufficient flexibility to accommodate itself to strains to which said body may be subjected without appreciably binding said sleeve.

8. In a pipe line expansion joint, a sleeve, and a body secured against lateral movement with respect to it and into which the sleeve extends, in combination with a guide slidably receiving said sleeve and rigidly positioned with respect to said body, said guide extending annularly around the joint sleeve into the said body otherwise unsupported and in spaced relation, providing an annular space around the guide where it engages the sleeve, the space being accessible to the pipe line content, a packing gland carried by said guide, immovable with relation thereto, extending about said sleeve, a packing ring on said sleeve cooperating with said gland, and means for adjusting said ring to change the packing without otherwise disturbing the joint assembly.

9. In a pipe line expansion joint, a sleeve, and a body secured against lateral movement with respect to it and into which the sleeve extends, in combination with a closely fitted guide slidingly receiving said sleeve, said guide being connected to said body at its outer end and extending annularly around the joint sleeve into the body in spaced relation thereto and having its inner surface provided with sharp edged recesses for cleaning foreign matter from said sleeve.

10. In a pipe line expansion joint, a sleeve, a flanged guide about the sleeve adapted to support the pipe line and a flanged body rigidly secured to the flange of said guide and extending about the guide from the flange to one end of the guide surrounding the sleeve, spaced from the guide to allow the medium from the pipe line to come in contact with the outside face of the guide.

11. A pipe line expansion joint sleeve guide radially enlarged at one end to be secured to the joint body, free from support elsewhere throughout its length and adapted to extend into the joint body radially spaced from the joint body from its radially enlarged end toward its unsupported end and to slidably receive the joint sleeve leaving a space between the guide and the joint body from the unsupported end of the guide to the radial enlargement, so that the medium from the pipe line can surround the guide.

12. In an expansion joint, an outer pipe, an inner pipe telescoping therein and an external cylindrical guide for the inner pipe radially extended over part of its length and rigidly positioned with respect to the outer pipe and elsewhere radially spaced from the outer pipe and admitting the medium from the pipe about the guide.

13. A pipe line expansion joint sleeve guide radially enlarged at one end for attachment to the joint body and adapted to extend from the enlarged end into the joint body in radially spaced relation to the joint body, admitting the pipe line medium around the outside surface of the guide, and to slidably receive the joint sleeve and being supported only at its enlarged end.

14. A pipe line expansion joint sleeve guide supported from the joint body near one end and adapted to extend axially into the joint body in spaced relation to the joint body, admitting the pipe line medium around the outside surface of the guide, and to annularly surround the joint sleeve and to be free from attachment to the joint body aside from the attachment near one end.

15. In an expansion joint, inner and outer pipes to connect at opposite ends of the joint to respectively adjacent pipes and intermediate the ends of the joint having overlapping telescoping end portions and the end portion of the outer pipe forming a packing space, a guide and a body in rigid connection longitudinally intermediate the overlapping ends of the pipes, the guide extending from the said connection toward the overlapping end of the inside pipe and along the said extension having an inward spacing from the body.

JOHN F. McKEE.